United States Patent
Grunnet-Jepson et al.

(10) Patent No.: US 7,095,925 B2
(45) Date of Patent: Aug. 22, 2006

(54) OPTICAL PHASED ARRAY TRANSMITTER/RECEIVER

(75) Inventors: Anders Grunnet-Jepson, San Jose, CA (US); John Sweetser, San Jose, CA (US); Alan Johnson, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/981,306

(22) Filed: Nov. 3, 2004

(65) Prior Publication Data

US 2006/0091305 A1    May 4, 2006

(51) Int. Cl.
G02B 6/34 (2006.01)
G01D 5/30 (2006.01)

(52) U.S. Cl. .................. 385/37; 385/4; 385/8; 385/10; 385/31; 250/231.14; 250/231.16; 250/231.18

(58) Field of Classification Search .................. 385/37
See application file for complete search history.

(56) References Cited

U.S. PATENT DOCUMENTS

| | | | | |
|---|---|---|---|---|
| 4,726,011 A | * | 2/1988 | Ih et al. .................... | 398/91 |
| 5,077,816 A | * | 12/1991 | Glomb et al. ............. | 385/37 |
| 5,093,876 A | * | 3/1992 | Henry et al. .............. | 385/28 |
| 5,450,511 A | * | 9/1995 | Dragone .................... | 385/37 |
| 5,457,760 A | * | 10/1995 | Mizrahi ..................... | 385/37 |
| 5,570,440 A | * | 10/1996 | Mizrahi ..................... | 385/37 |
| 5,608,825 A | * | 3/1997 | Ip .............................. | 385/24 |
| 5,627,927 A | * | 5/1997 | Udd .......................... | 385/37 |
| 5,638,473 A | * | 6/1997 | Byron ....................... | 385/37 |
| 5,680,489 A | * | 10/1997 | Kersey ...................... | 385/12 |
| 5,748,350 A | * | 5/1998 | Pan et al. ................... | 398/87 |
| 5,793,907 A | * | 8/1998 | Jalali et al. ................ | 385/24 |
| 5,818,585 A | * | 10/1998 | Davis et al. ............... | 356/477 |
| 5,825,520 A | * | 10/1998 | Huber ....................... | 398/87 |
| 5,982,334 A | | 11/1999 | Manasson et al. | |
| 5,982,516 A | * | 11/1999 | Murphy et al. ............ | 398/51 |
| 5,987,197 A | * | 11/1999 | Kersey ...................... | 385/24 |
| 6,014,480 A | * | 1/2000 | Baney ....................... | 385/24 |
| 6,041,070 A | * | 3/2000 | Koch et al. ................ | 372/6 |
| 6,137,442 A | * | 10/2000 | Roman et al. ............. | 342/375 |
| 6,292,282 B1 | * | 9/2001 | Mossberg et al. ......... | 398/99 |
| 6,295,304 B1 | * | 9/2001 | Koch et al. ................ | 372/6 |
| 6,313,771 B1 | * | 11/2001 | Munroe et al. ............ | 341/137 |

(Continued)

OTHER PUBLICATIONS

Teh et al, "A Comparative Study of the Performance of Seven—and 63-Chip . . . ", Journal of Lightwave Tech., vol. 19, No. 9, Sep. 2001.*

(Continued)

*Primary Examiner*—Frank G. Font
*Assistant Examiner*—Ryan Lepisto
(74) *Attorney, Agent, or Firm*—David W. Victor; Konrad Raynes & Victor LLP

(57) ABSTRACT

An optical phased array transmitter/receiver includes a plurality of waveguides each including an optical fiber and a light source coupled to the fibers in the waveguides. At least one grating is coupled to the fiber of each waveguide and at least one phase shifter coupled to the fiber of at least one waveguide. The phase shifter controls a phase profile of light passing through the fiber to control a profile of a laser beam reflected at the grating. The gratings reflect light passing through the fibers outside of the optical coder to form a laser beam shaped and directed by the grating and phase shifters. Further, a detector is coupled to the waveguides that is enabled to receive light reflected off the gratings. Other embodiments are described and claimed.

30 Claims, 5 Drawing Sheets

U.S. PATENT DOCUMENTS

| | | | |
|---|---|---|---|
| 6,314,220 B1 * | 11/2001 | Mossberg et al. | 385/37 |
| 6,449,073 B1 * | 9/2002 | Huber | 398/82 |
| 6,456,762 B1 * | 9/2002 | Nishiki et al. | 385/37 |
| 6,485,413 B1 | 11/2002 | Boppart et al. | |
| 6,522,797 B1 * | 2/2003 | Siems et al. | 385/12 |
| 6,591,025 B1 * | 7/2003 | Siems et al. | 385/12 |
| 6,594,421 B1 | 7/2003 | Johnson et al. | |
| 6,765,681 B1 | 7/2004 | Sweetser et al. | |
| 6,778,102 B1 * | 8/2004 | Grunnet-Jepsen et al. | 341/50 |
| 6,807,372 B1 * | 10/2004 | Lee et al. | 398/78 |
| 6,865,344 B1 * | 3/2005 | Johnson et al. | 398/77 |
| 2002/0030877 A1 * | 3/2002 | Way et al. | 359/183 |
| 2002/0163696 A1 * | 11/2002 | Huang et al. | 359/154 |
| 2005/0089328 A1 * | 4/2005 | Nishiki et al. | 398/77 |

OTHER PUBLICATIONS

Teh et al, "Phase Encoding and Decoding of Short Pulse . . . ", IEEE Photonics Tech. Letters, vol. 13, No. 2, Feb. 2001.*

Huang et al, "Optical Spectral-Amplitude Coder/Decoders . . . ", IEEE, Jun. 2004.*

Huang et al, "Fiber-Grating Based Optical CDMA . . . ", IEEE Photonics Tech. Letters, vol. 12, No. 9, Sep. 2000.*

Grunnet-Jepsen et al, "Demonstration of All-Fiber Sparse Lightwave CDMA Based on Temporal Phase Encoding", IEEE Photonics Tech Letters, vol. 11, No. 10, Oct. 1999.*

Chiaro Networks, "Optical Phased Array Technology for High-Speed Switching", 2002, pp. 1-7.

Grunnet-Jepson, A., A.E. Johnson, E.S. Maniloff, T.W. Mossberg, M.I. Munroe, & J.N. Sweetser, "Demonstartion of All-Fiber Sparse Lightwave CDMA Based on Temporal Phase Encoding", *IEEE Photonics Technology Letters*, vol. 11, No. 10, Oct. 1999, pp. 1283-1285.

Huang, J., and D. Hsu, "Fiber-Grating Based Optical CDMA Spectral Coding with Nearly Orthogonal M-Sequence Codes", *IEEE Photonics Technology Letters*, vol. 12, No. 9, Sep. 2000, pp. 1252-1254.

Huang, J. C. Tsai, & M. Kang, "Optical Spectral-Amplitude Coder/Decoders Structured with Circulator-Free Fiber-Gratings Array", 2004, pp. 550-554.

"Polymer-based Guided Wave True-time Delay Module for Phased Array Atenna", [online], [Retrieved on Aug. 22, 2004], retrieved from the Internet at <URL: http://www.ece.utexas.edu/projects/ec/mrc/groups/optic-inter/Phased_Array_Antenna.htm>.

Skolnik, M.I., "Introducing Radar Systems", Third Edition, 2001, pp. 559-589.

Teh, P.C., P. Petropoulos, M. Ibsen, D.J. Richardson, "A Comparative Study of the Performance of Seven-and 63-Chip Optical Code-Division Multiple-Access Encoders and Decoders Based on Superstructured Fiber Bragg Gratings", *Journal of Lightwave Technology*, vol. 19, No. 9, Sep. 2001, pp. 1352-1365.

Teh, P.C., P. Petropoulos, M. Isben, & D.J. Richardson, "Phase Encoding and Decoding of Short Pulses at 10 Gb/s Using Superstructured Fiber Bragg Gratings", *IEEE Photonics Technology Letters*, vol. 13, No. 2, Feb. 2001.

Wang, M., B. Wang, J. Anderson, P.J. Bos, & P.P. McManamon, "Optical Phased Array Technology for Beam Steering and Wavefront Control", Mar. 7, 2003.

* cited by examiner

OPTICAL PHASED ARRAY TRANSMITTER/RECEIVER

BACKGROUND

A phased array is a directive antenna made up of individual antennas or radiating patterns. The radiating pattern is determined by the amplitude and phase of the current at each element. The phased array antenna may have its beam electronically steered in angle by changing the phase of current at each element. A linear array consists of antenna elements arranged in a straight line in one dimension. A planar array is a two dimensional configuration of antenna elements arranged to lie in a plane. In both the linear and planar arrays, the element spacings are usually uniform. Further details of phrased array antenna are described in the book "Introduction to Radar Systems, 3d Edition", by Merill I. Skolnik (McGraw-Hill, 2001).

An optical phased array is a phased array implemented in an optical device. One optical phased array has a single light source laser beam expanded through a lens into multiple beams, where each of the multiple beam passes through an array of phase shifters comprised of spatial light modulators (SLMs). The SLMs control the wavefront to shift the phase, such that each SLM may have a different phase delay, or relative time delays between the different SLMs, to control the steering of the beam and create a phase ramp. Further, changing the phase at each SLM in the array may also produce different antenna lob effects to provide a phased array antenna.

DETAILED DESCRIPTION

Figure 1:
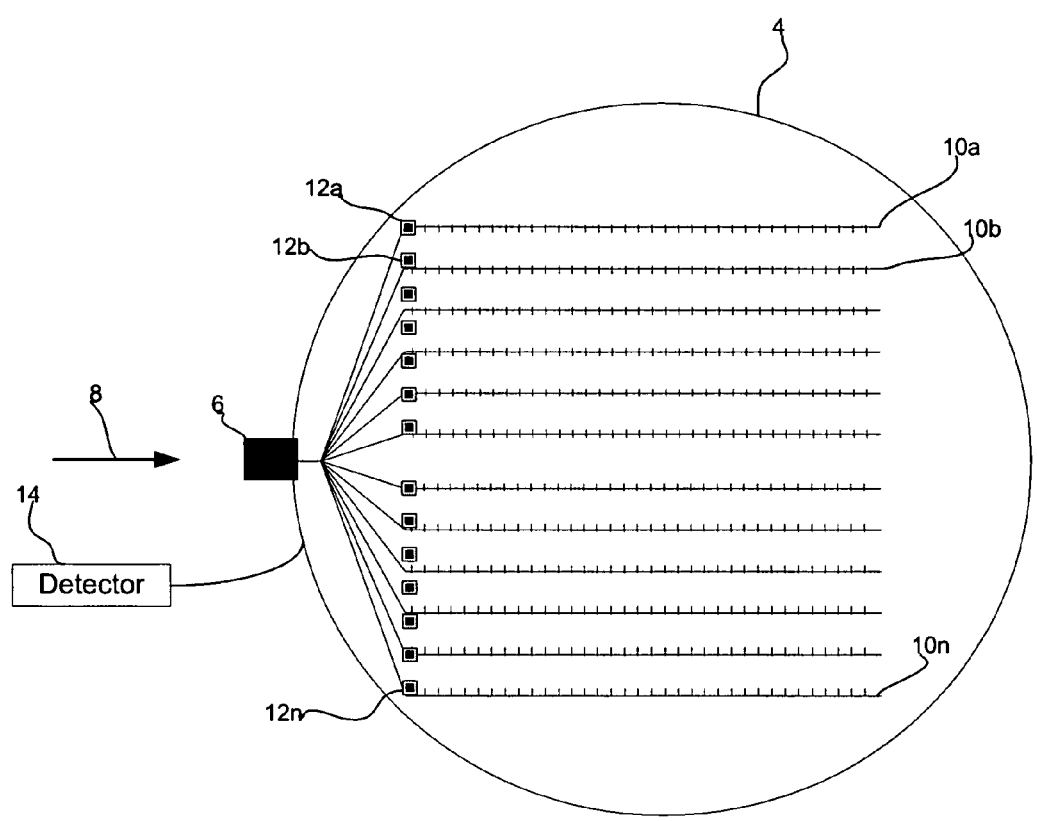
FIG. 1 illustrates an optical device.

In the following description, reference is made to the accompanying drawings which form a part hereof and which illustrate several embodiments. It is understood that other embodiments may be utilized and structural and operational changes may be made without departing from the scope of the embodiments.

As used herein, a "programmable" device is a device having properties that are electrically, thermally, mechanically, or otherwise tunable after manufacture of the device is complete. Programmable devices include waveguides, waveguide gratings, corrugation segments and spacer segments of waveguides, and coders using such waveguides and waveguide segments. "Coder" and "code generator" are used herein to refer to devices that either encode an input to produce an encoded output or that decode an input to produce a decoded output. Coders can encode and decode phase codes, amplitudes codes, or other codes. "Gratings" are waveguide segments that include a variation in one or more optical properties. Such variations can be periodic with a single period or multiply periodic (a sum of several variations of different periods). More complex variations are also possible such as chirped variations in which the period of the variation changes continuously. Waveguide regions that contain no periodic variations but that are programmable to adjust a phase or other parameter of an optical pulse are referred to as "spacer segments." In some embodiments, spacer segments include a phase shifter to permit phase modulation. As used herein, "tunable" refers to a device that imparts a phase, amplitude, or other modulation to incident electromagnetic radiation, wherein the modulation can be programmatically adjusted after device manufacture.

The described embodiments may be implemented using "electro-optic" materials, which are materials in which an applied voltage, electric field, or magnetic field produces a change in an optical property of the material.

Waveguides that include programmable composite gratings defined in a core or a cladding or other layer of a waveguide are provided. According to a specific embodiment, a programmable coder includes an optical waveguide having an electrically controllable index of refraction in one or more spatially distinct waveguide segments, each segment having a periodic refractive-index modulation.

Other example embodiments include one or more channel waveguides fabricated in an electro-optic material. The channel waveguides comprise alternating grating segments and phase-shift segments (spacer segments). The channel waveguides include one or more electrodes so that voltages applied to the grating segments are independently controllable to adjust a Bragg wavelength of each grating segment. The channel waveguides also include phase-shift segments that are independently controllable, so that optical delays or phase shifts between grating segments are independently controllable using a "phase shifter". An input pulse with bandwidth sufficient to span the operational bandwidth of such a channel waveguide (i.e., an input pulse having a bandwidth that spans the center frequencies of all grating segments of the channel waveguide) produces a diffracted output that comprises a set of spectrally and temporally selected subpulses with programmed phase shifts and frequencies. The bandwidth and center frequency of a particular subpulse depend upon the grating segment that produced that subpulse. Output timing (and hence phase) of the subpulse is determined by a spatial position of the grating that produced the subpulse and of the index of refraction of the grating segments and phase-shifting segments through which that subpulse is transmitted before exiting the channel waveguide.

Additional examples, methods, and features are described below with reference to the accompanying drawings.

FIG. 1 illustrates a planar optical waveguide circuit 2, i.e., a photonic integrated circuit, implemented on a silica-on-silicon wafer 4. The circuit 2 includes a single-mode waveguide 6 for receiving a laser light 8 from a light source. The waveguide 6 splits the received beam 8 among n parallel waveguides 10a, 10b . . . 10n, each comprising a linear array of gratings, such as Bragg gratings. The Bragg gratings in each waveguide, e.g., 10a, 10b . . . 10n, act as distributed mirrors to couple light out of the plane of the wafer 4. The circuit 2 can operate as a broad area laser source (or receiver). The relative phase of the gratings in each of the linear arrays 10a, 10b . . . 10n, as well as the spatial amplitude and phase profile of the gratings controls the profile of the laser beam in the far field to direct the beam. By controlling the phase in a manner known in the phase array art to generate radiation patterns known in the art, it is possible to focus a beam in a certain direction with little cross-talk (side-lobes) into other directions or multiple simultaneous directions. The beam may directed out of the optical waveguide circuit 2.

Each waveguide 10a, 10b . . . 10n includes one or more phase shifters 12a, 12b . . . 12n that may be used to control the relative energy and phase in each waveguide 10a, 10b . . . 10n dynamically in real time.

Figure 2:
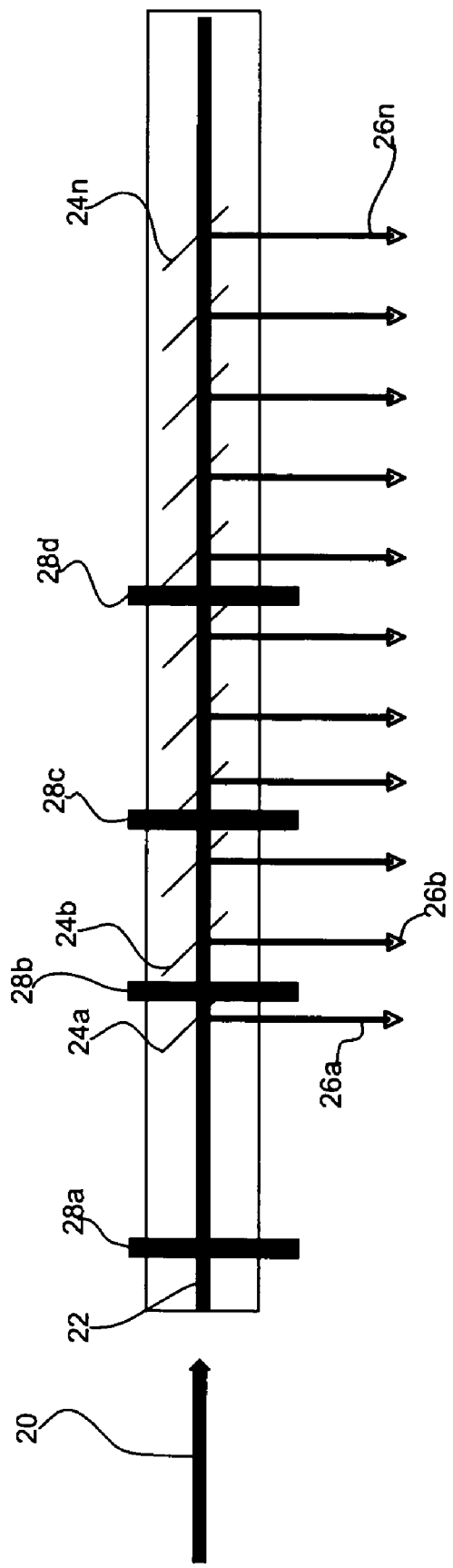
FIG. 2 illustrates a phase shifter that may be used in the optical device.

FIG. 2 illustrates an example of one of the linear arrays 10a, 10b . . . 10n of Brag gratings. Light 20 enters a fiber 22 having Bragg gratings, e.g., 24a, 24b . . . 24n. Light 20 travels through the fiber 22 in the horizontal direction. As light comes into contact with a Bragg grating 24a, 24b . . . 24n, i.e., a grating segment, most of the light beam passes through and a portion of the light 26a, 26b . . . 26n is reflected off the Bragg grating and directed out of the fiber 22 and optical waveguide circuit 2 producing the beam. In certain embodiments, the Bragg gratings 24a, 24b . . . 24n form a 45 degree angle incident with the fiber 22. In this way, each Bragg grating 24a, 24b . . . 24n is reflecting light out of the fiber 22 to control the profile of the beam. Four phase shifters 28a, 28b, 28c, and 28d, referred to in FIG. 1 as phase shifters 12a, 12b . . . 12n, are coupled to phase shift segments (spacer segments) the gratings 24a, 24b . . . 24n, i.e., grating segments. Additional or fewer phase shifters may be placed before the gratings, such that there may be one phase shifter between every two gratings. These phase shifters 28a, 28b . . . 28n may be programmable to supply voltage to the fiber 22 to change the phase, i.e., optical delay, of the light 20 deflected off of the gratings 24a, 24b . . . 24n out of the optical device 2. Moreover, a wide variety of layouts may be employed for heating elements for the phase shifters 28a, 28b . . . 28n, including a large number of discrete heaters, a transverse series of serpentine heaters that allow for simple analog control of the direction of the optical beam, etc.

By controlling the phase shifters 28a, 28b . . . 28n to adjust the phase of the light, different light patterns are generated to steer the beam in different directions. Further, the array of the linear arrays of gratings can be modified to have different phases and amplitude to change the shape and direction of the light beam reflected off the gratings 24a, 24b . . . 24n. In addition to steering the beam, the phase can be adjusted to tailor the shape of the beam. For example, the beam can be apodized in phase and amplitude to create a flat-top profile, or to create a "Bessel-like" beam for diffraction-less propagation. Yet further, in certain embodiments, a randomly spaced array of waveguides, i.e., the linear arrays of gratings 10a, 10b . . . 10n, as opposed to a regular spaced array as shown in FIG. 1. Use of a randomly spaced array of waveguides may reduce unwanted side-lobes that result from a discrete and finite number of array elements. The phase shifters 12a, 12b . . . 12n may also include circuitry to control the amplitude of the light as well as the phase, such as a variable optical attenuator.

Figure 3:
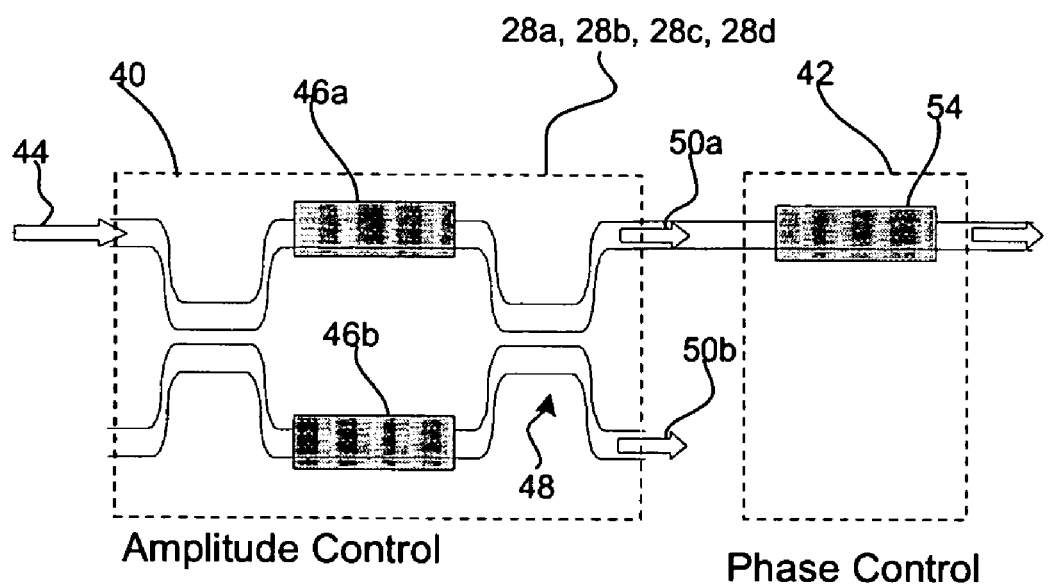
FIG. 3 illustrates an element used to control the relative energy and phase in each waveguide in the optical device.

FIG. 3 illustrates details of the phase shifters 28a, 28b, 28c, 28d, also referred to as 12a, 12b . . . 12n in FIG. 1, used to control the relative energy and phase in each waveguide, receiving a light beam from the single-mode waveguide 6. The phase shifters 28a, 28b, 28c, 28d include an amplitude control 40 and a phase control 42. The amplitude control 40 receives an input light 44 from a source that passes through heaters 46a, 46b that control the local phase of the light 44. The light 44 then passes through a 50—50 coupler 48 which produces output beams 50a, 50b, where output 52b is light that is drained and not used. The coupler 48 couples lines together from different waveguides. By controlling the heat applied by the heaters 46a, 46b, the amplitude of the output light 50a can be controlled. Light 50b comprises dissipated light. In this way, the amplitude control 40 adjusts the amplitude of the output light 50a. The phase control 42 includes a heater 54 that applies energy to the light 50a passing through to set the phase of the light.

Figure 4A:
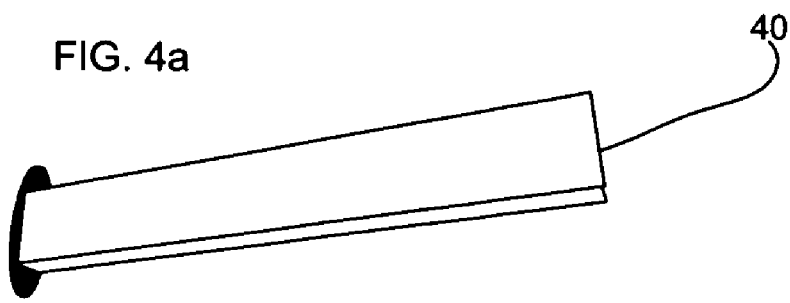
FIGS. 4a, 4b, 4c, and 4d illustrate examples of laser beams produced by the optical device.
Figure 4B:
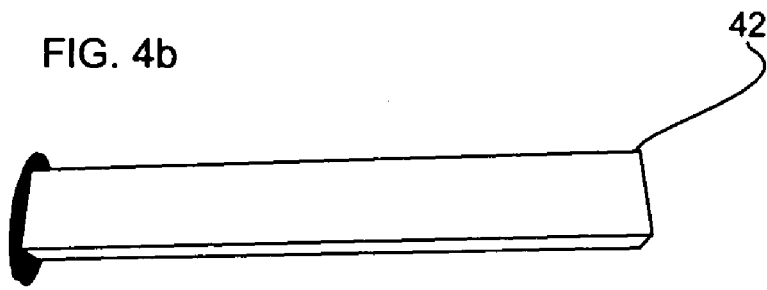
Figure 4C:
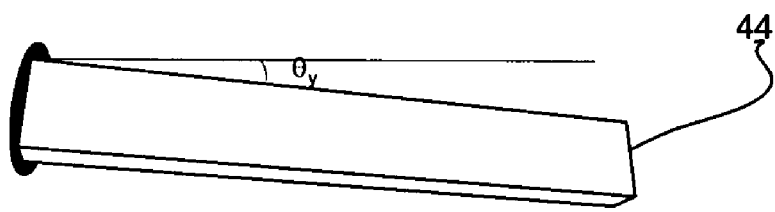
Figure 4D:
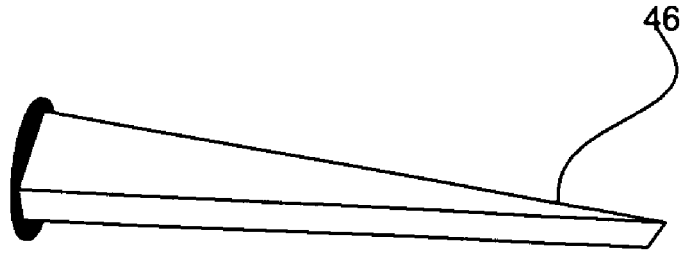

FIGS. 4a–4d illustrate examples of different shapes of the beams 40, 42, 44, and 46, respectively, that may be created by adjusting the phase and amplitude of the light beam reflected off the gratings 24a, 24b . . . 24n by controlling the voltages applied by the phase shifters 28a, 28b . . . 28n. FIGS. 4a, 4b, and 4c illustrates how the beam can be apodized in phase and amplitude to create a flat-top profile, or a "Bessel-like" beam for diffraction-less propagation controlled in different directions. FIG. 4c illustrates that the beam is created by using a grating diffraction angle $\theta y$. FIG. 4d provides an example of how the phase shifters 28a, 28b . . . 28n may be controlled to focus the beam.

FIG. 1 additionally illustrates how the optical device 2 may be used in reverse to collect light through the Bragg gratings that is deflected into a detector 14. The directivity of this receiving optical antenna may be tailored in the same way described above when the optical device 2 functions as a transmitter. Operating as a receiver, the phases can be configured to "null" out light received from certain directions at the gratings. If a circulator or splitter is attached to the optical device 2 with the detector 14, the optical device 2 can be used to send light and receive light simultaneously, i.e. a transceiver. In another embodiment, a mirror (or reflective Bragg grating) can be placed in the fiber 22. If light is incident on the front face of such a device, it will be perfectly retro-reflected for a single predetermined input direction only toward the detector 14.

Figure 5:
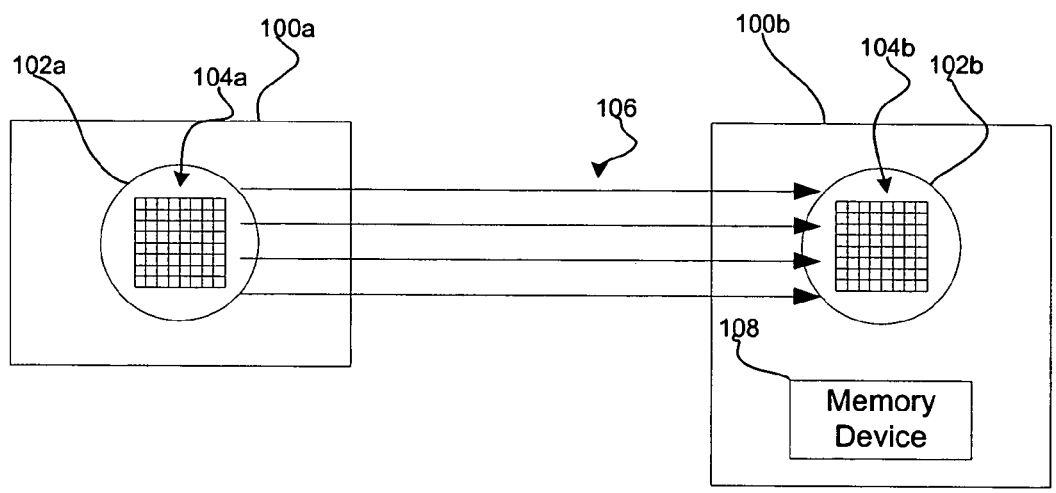
FIG. 5 illustrates optical devices in laser communication with one another.

FIG. 5 illustrates a system comprised of two devices 100a, 100b each including a substrate 102a, 102b, which may be implemented on an integrated circuit die, forming a surface having a plurality of elements 104a, 104, where each element in the array of elements 104a, 104b may comprise an optical device 2 shown in FIG. 1. Multiple elements in the array of elements 104a communicates light beams to elements in the array of elements 104b acting as a receiver. The arrays of elements 104a, 104b may comprise transceivers and both transmit and receive light beams 106 therebetween. Further, device 100b may include a memory device 108, such as a volatile or non-volatile memory device, to store data encoded in the light beams communicated from the device 100a. Similarly, device 100a may include a memory device to store data encoded in light transmitted from device 100b. By proper feedback control, it is possible to ensure that the arrays off elements 104a, 104b never loose contact with each other as their beams steer to adjust for any relative motion. The substrates 102a, 102b may comprise integrated circuits. In further embodiments, the devices 100a, 100b may include multiple substrates, each having an array of elements, forming a larger scale array distributed across multiple integrated circuit substrates. The devices 100a, 100b may comprise a communication device in a stationary location, such as in a building, etc. Alternatively, the devices 100a, 100b may be integrated in a moving device, such as a ship, automobile, etc. In implementations, where the devices 100a, 100b are included in systems that move, the elements in the arrays 104a, 104b may be programmable to allow the transmitter and receiver elements to adjust their phase in the event the arrays 104a, 104b change their position. The phase of the transmitter and receiver arrays 104a, 104b may be adjusted to allow the receiver array 104b to remain locked on or continue receiving the beam from the transmitter array 104a. The devices 100a, 100b may comprise communication systems, such as transmitters and receivers or modems to enable wireless transmission and reception.

The described embodiments provide an optical device implementing a phased array in the optical domain to maintain a fixed and coherent phase relationship of light and that can be used for dynamic (or static) shaping of coherent optical beams for laser beam delivery or high directivity optical telescopes.

The optical device of the described embodiments may comprise a small form factor pseudo-dimensional structure enabled to make a large area structure coherent optical array with high optical power capacity. The described embodiments use blazed waveguide Bragg gratings, or other suitable gratings known in the art, which can be patterned with prescribed phase and amplitude functions for biasing the beam shape and creating beams with reduced side lobes. Described embodiments provide for increased frequency over RF phased arrays allowing for communication at greatly increased bandwidths compared to an RF phased array antenna and with higher directivity. The described optical device may be integrated in a photonic integrated circuit with other functionalities such as on-chip optical amplification, switching, and wavelength filtering. The described embodiments may enable optical chip-to-chip communication with quick switching/beam steering, may allow for reading/writing to optical memory using beam steering, may allow for viable laser space communication, and may provide a small light-weight large-area laser/receiver.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. An optical coder, comprising:
a plurality of waveguides each including an optical fiber;
a light source coupled to the fibers in the waveguides;
at least one grating coupled to the fiber of each waveguide; and
at least one phase shifter coupled to the fiber of at least one waveguide before at least one grating, wherein the phase shifter controls a phase profile of light passing through the fiber to control a profile of a laser beam reflected at the at least one grating, wherein the at least one grating reflects light passing through the fibers outside of the optical coder to form a laser beam shaped and directed by the at least one grating and the at least one phase shifter.

2. The optical coder of claim 1, wherein the plurality of waveguides are arranged in an array.

3. The optical coder of claim 2, wherein the waveguides are spaced equidistant from one another.

4. The optical coder of claim 1, further comprising:
a single-mode waveguide enabled to receive a light beam from the light source and split the light beam to input to the plurality of waveguides.

5. The optical coder of claim 1, wherein there are a plurality of gratings in each waveguide comprising a blazed Bragg grating.

6. The optical coder of claim 1, wherein the laser beam is shaped to reduce an effect of side lobes.

7. The optical coder of claim 1, wherein the at least one phase shifter comprises a heating element to apply energy to the light passing through the fiber.

8. The optical coder of claim 1, further comprising:
at least one amplitude control coupled to the fiber in each waveguide to adjust an amplitude of light passing through the fiber.

9. The optical coder of claim 1, wherein the optical coder is programmable.

10. An optical coder, comprising:
a plurality of waveguides each including an optical fiber;
at least one grating coupled to the fiber of each waveguide;
at least one phase shifter coupled to the fiber of at least one waveguide before at least one grating, wherein the at least one phase shifter controls a phase profile of light passing through the fiber to control a profile of a laser beam reflected at the at least one grating, wherein the at least one grating reflects light passing through the fibers outside of the optical coder to form a laser beam shaped and directed by the at least one grating and the at least one phase shifter; and
a detector coupled to the waveguides enabled to receive light reflected off the at least one grating.

11. The optical coder of claim 10, wherein the at least one phase shifter controls the phase of light reflected off the at least one grating passing through the fiber to null out light received from certain directions.

12. A substrate forming a surface having multiple elements, wherein at least one of the elements comprises:
a plurality of waveguides each including an optical fiber;
a light source coupled to the fibers in the waveguides
at least one grating coupled to the fiber of each waveguide; and
at least one phase shifter coupled to the fiber of at least one waveguide before at least one grating, wherein the phase shifter controls a phase profile of light passing through the fiber to control a profile of a laser beam reflected at the at least one grating, wherein the at least one grating reflects light passing through the fibers outside of the substrate to form a laser beam shaped and directed by the grating and phase shifters.

13. The substrate of claim 12, wherein at least one of the elements further comprises:
a single-mode waveguide enabled to receive the light beam from a light source and split the light beam to input to the plurality of waveguides.

14. The substrate of claim 12, wherein there are a plurality of gratings in each waveguide comprising a blazed Bragg grating.

15. The substrate of claim 12, wherein the laser beam is shaped to reduce an effect of side lobes.

16. The substrate of claim 12, wherein the at least one phase shifter comprises a heating element to apply energy to the light passing through the fiber.

17. The substrate of claim 12, further comprising:
at least one amplitude control coupled to the fiber in each waveguide to adjust an amplitude of light passing through the fiber.

18. The substrate of claim 12, wherein the elements on the substrate implement a phased array antenna transmitting beams.

19. A substrate forming a surface having multiple elements, wherein at least one of the elements comprises:
a plurality of waveguides each including an optical fiber;
at least one grating coupled to the fiber of each waveguide;
at least one phase shifter coupled to the fiber of at least one waveguide before at least one grating, wherein the at least one phase shifter controls a phase profile of light passing through the fiber to control a profile of a laser beam reflected at the at least one grating, wherein the at least one grating reflects light passing through the fibers outside of the substrate to form a laser beam shaped and directed by the at least one grating and the at least one phase shifter; and a detector coupled to the waveguides enabled to receive light reflected off the at least one grating.

20. The substrate of claim 19, wherein the at least one phase control shifter controls the phase of light reflected off the at least one grating passing trough the fiber to null out light received from certain directions.

21. The substrate of claim 19, wherein the elements on the substrate implement a phased array antenna receiving transmitted beams.

22. A system, comprising:
a first device including a transmitting optical coder, wherein the optical coder comprises: a plurality of waveguides each having an optical fiber; at least one grating coupled to the fiber of each waveguide; and at least one phase shifter coupled to the fiber of at least one waveguide before at least one grating, wherein the phase shifter controls a phase profile of light passing through the fiber to control a profile of a laser beam reflected at the at least one grating, wherein the at least one grating reflects light passing through the fibers outside of the optical coder to form a laser beam shaped and directed by the at least one grating and the at least one phase shifter; and a second device including:
(i) a receiving optical coder, comprising: a plurality of waveguides each having an optical fiber; at least one grating coupled to the fiber of each waveguide; and at least one phase shifter coupled to the fiber of at least one waveguide before at least one grating, wherein the phase shifter controls a phase profile of light passing trough the fiber to control a profile of the laser beam transmitted by the transmitting optical coder reflected into the receiving optical coder at the at least one grating; and a detector coupled to the waveguides enabled to receive light reflected off the at least one grating transmitted from the transmitting optical encoder; and (ii) a memory device for storing data encoded in the received light transmitted from the transmitting optical encoder.

23. The system of claim 22, wherein the transmitting and receiving optical coders are programmable to enable adjustment of the profile of light transmitted and received to the first and second devices in transmission communication.

24. The system of claim 22, wherein the plurality of waveguides in the transmitting and receiving optical coders are arranged in an array.

25. The system of claim 22, wherein there are a plurality of gratings in each waveguide comprising a blazed Bragg grating.

26. The system of claim 22, wherein the transmitting optical coder further comprises:
a light source coupled to the fibers in the waveguides, wherein the gratings reflect light passing through the fibers outside of the optical coder to form a laser beam shaped and directed by the grating and phase shifters.

27. The system of claim 22, wherein the transmitted laser beam is shaped to reduce an effect of side lobes.

28. The system of claim 22, wherein the phase shifters comprise heating elements to apply energy to the light passing through the fibers.

29. The system of claim 22, wherein optical coders further comprises:
at least one amplitude control coupled to the fiber in each waveguide to adjust an amplitude of light passing through the fiber.

30. The system of claim 22,
wherein the transmitting device further includes a substrate forming a surface having a plurality of elements, wherein each of the elements comprises an instance of the transmitting optical coder; and
wherein the receiving device further includes a substrate forming a surface having a plurality of elements, wherein each of the elements comprises an instance of the receiving optical coder.

* * * * *

UNITED STATES PATENT AND TRADEMARK OFFICE
CERTIFICATE OF CORRECTION

| | |
|---|---|
| PATENT NO. | : 7,095,925 B2 |
| APPLICATION NO. | : 10/981306 |
| DATED | : August 22, 2006 |
| INVENTOR(S) | : Anders Grunnet-Jepsen, John Sweetser and Alan Johnson |

It is certified that error appears in the above-identified patent and that said Letters Patent is hereby corrected as shown below:

Column 7, Line 10, delete "phase control shifter" and replace with --phase shifter--.

Column 7, Line 11, delete "trough" and replace with --through--.

Column 7, Line 37, delete "trough" and replace with --through--.

Signed and Sealed this

Third Day of November, 2009

David J. Kappos
*Director of the United States Patent and Trademark Office*